Aug. 17, 1937.　　W. F. ZIMMERMANN ET AL　　2,090,508
ELECTRIC TOOL LIFTER FOR SHAPERS
Filed Sept. 15, 1936　　3 Sheets-Sheet 1
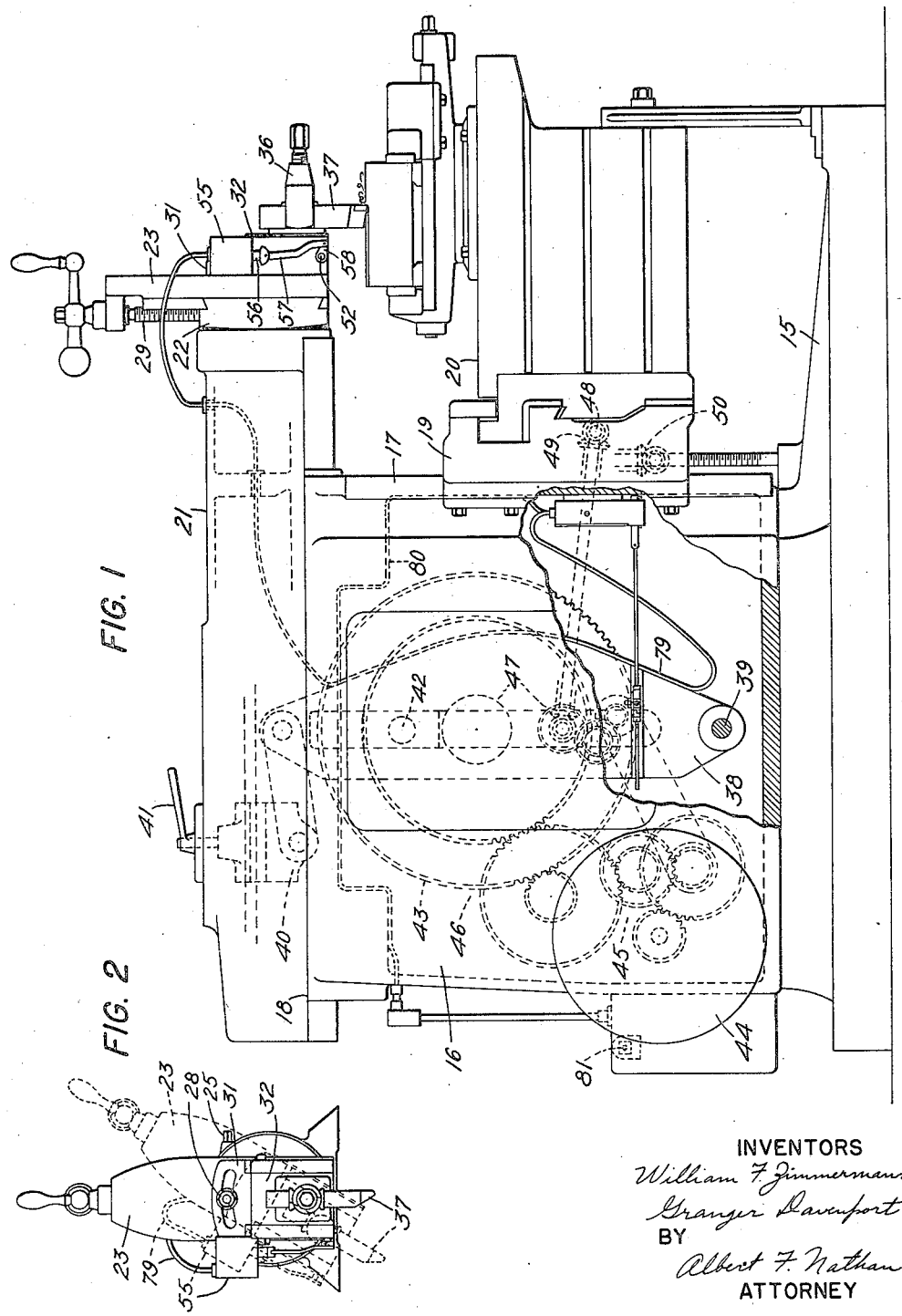
INVENTORS
William F. Zimmermann
Granger Davenport
BY
Albert F. Nathan
ATTORNEY

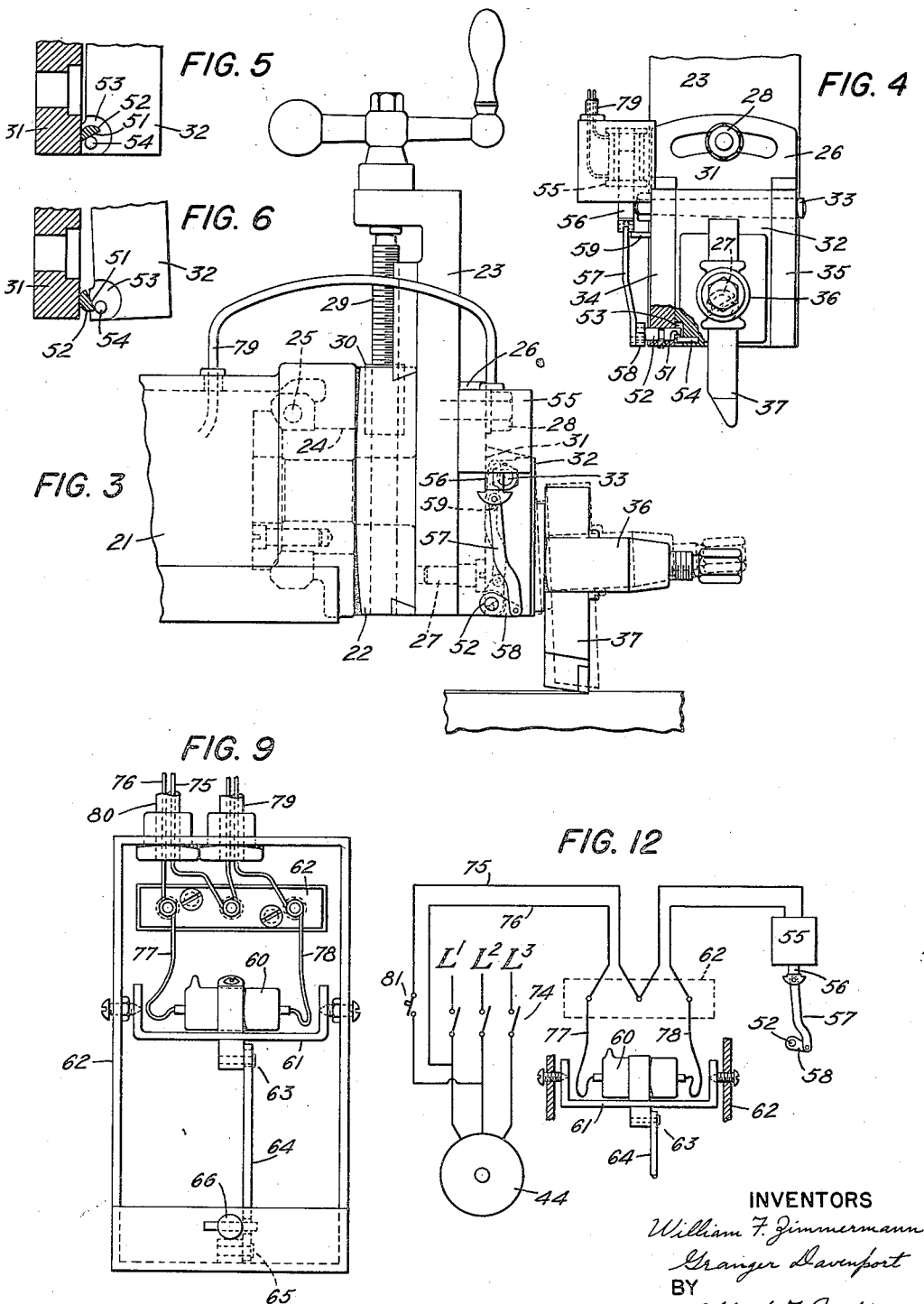

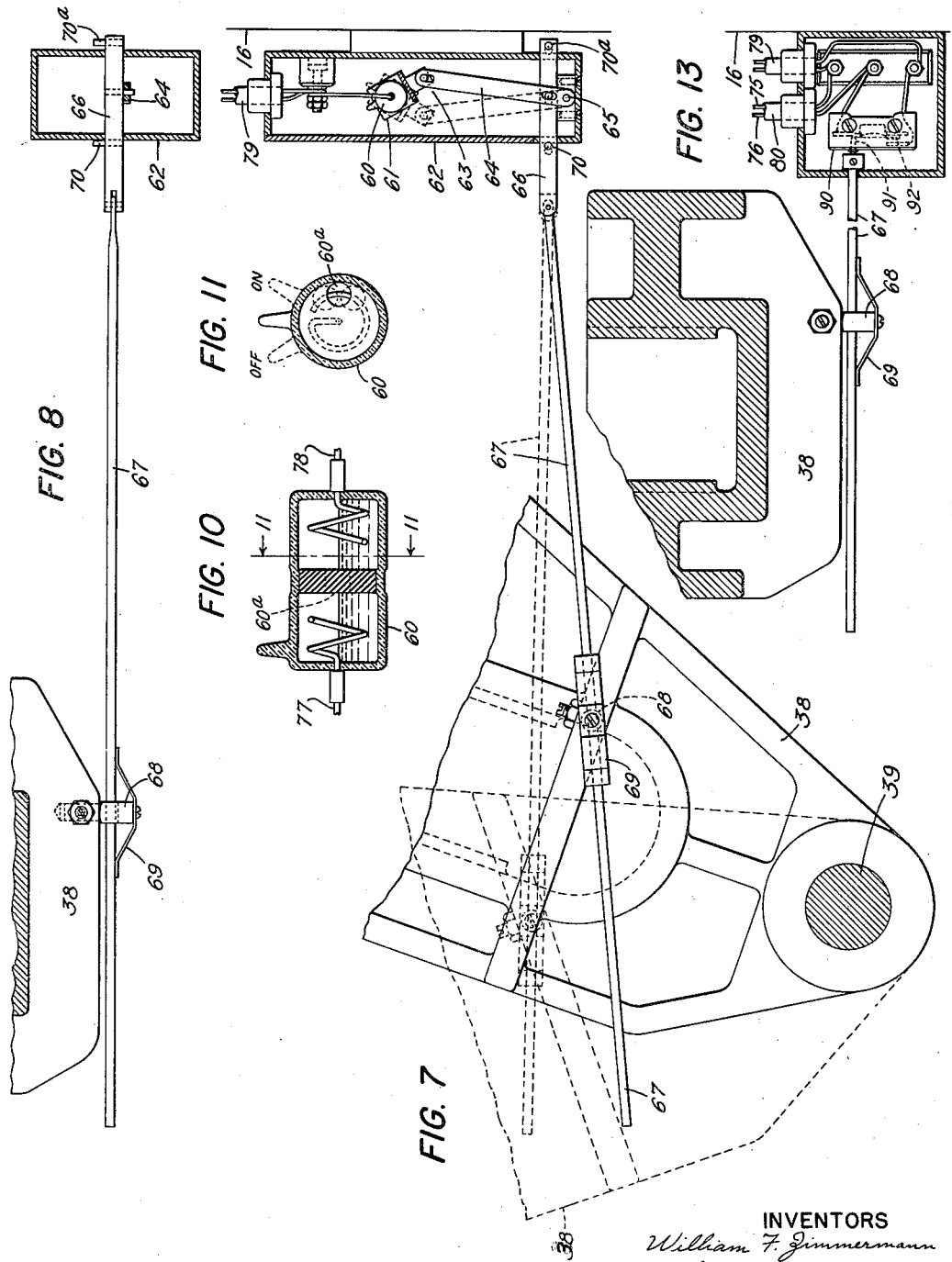

Patented Aug. 17, 1937

2,090,508

UNITED STATES PATENT OFFICE 2,090,508

ELECTRIC TOOL LIFTER FOR SHAPERS

William F. Zimmermann, Maplewood, N. J., and Granger Davenport, Brooklyn, N. Y., assignors to Gould & Eberhardt, Newark, N. J., a corporation of New Jersey Application September 15, 1936, Serial No. 100,830

11 Claims. (Cl. 90—55)

This invention relates to shaping machines and particularly to means automatically operable in timed relation with the ram movements to lift the tool clear of the work on the return or non-cutting stroke.

It has for a primary object to render available an electrically controlled and operated tool lifting device that may readily be attached to existing machines and when installed to operate automatically to lift the tool at the end of the cutting stroke and prevent the tool from dropping or back-tracking upon the workpiece.

It is customary in shaping machines to mount the tool in a clapper-box carried at the forward end of the ram, so constructed that when the ram is moving forward on its cutting stroke, the clapper member seats firmly against its bearing plate as it propels the tool through the workpiece. At the end of the cutting stroke, the clapper and tool is free to swing forward and upwardly so that upon the reverse stroke of the ram, the tool may elevate and ride over the top of the work.

At the higher speeds of ram reciprocation, reversals occur more suddenly and in consequence the inertia of the hinged clapper and tool cause it to swing outwardly greater distances from the bearing plate and thereafter falling with considerable impact upon the workpiece.

Tools for shaping machines are designed to cut in one direction only and consequently are heavily reinforced behind the cutting edge. The front of the tool is usually relieved away from the cutting edge to give the required rake, and since no support whatever is given to the cutting point at that side, the edge is quickly broken off when the forces are reversed. Particularly is this true with cemented carbide tools which are notably brittle and sensitive to breakage when dropped or back-tracked on the workpiece. And in shaping machines the repeated impacts induced by the swinging clapper, unduly damaged the cutting point of the tool and it was not long before the cutting edge was broken.

The present invention has for a primary object to prevent abuse of this nature to the tool or workpiece and to render available a tool lifting device for shapers that automatically lifts the tool at the end of the forward stroke and prevents it from falling upon or back-tracking on the workpiece during the return stroke.

The invention further aims to provide a device for accomplishing that end which may be readily adapted to shapers without materially altering the parts thereof and when so embodied will automatically adjust itself to the length or the range of stroke of the shaper and effectively perform its function of lifting the tool on the return stroke at all operating speeds within the range of the machine.

A further object of the invention is to provide a tool lifting device that may be mounted directly upon a universally adjustable clapper-box of a shaper and be movable bodily therewith to all positions angularly and radially that the clapper-box may assume and operate automatically to raise and lower the tool in said positions. By way of additional refinements, the invention further aims to provide a mechanism, embodying a minimum number of compactly arranged operating parts enclosed within casings or within the main frame of the machine to occupy as little space as possible and to be protected from unauthorized tampering or inadvertent or accidental bumping or damage.

Another object of the invention is to provide a tool lifter mechanism that operates automatically in timed relation to the movement of the ram to raise and lower the tool promptly and with certainty at the start of each reversal in ram movement so that the machine may be set to give the minimum length of stroke on a particular workpiece or used to cut to a given line, if necessary, without the tool being positively propelled forward beyond the predetermined point or line.

Still another objective of this invention is to utilize the power, such as electrical power, already available in the shaper for actuating and controlling the lifting of the tool cyclically with the ram movements and to provide means for insuring that the current to the electrical devices is disconnected whenever the main actuating motor is stopped thereby to prevent the operator from inadvertently leaving the machine with the power "on" to certain elements thereof.

In carrying out these and other objectives of this invention it is proposed to embody between the clapper and bearing plate members of the clapper-box, a one way acting cam element and to actuate said element to an effective position by an electrically operated solenoid mounted directly upon the clapper-box. The control for the solenoid is located preferably within the main frame of the machine but may if desired be positioned at the outside thereof in cooperative relation with the ram movements and includes preferably an oscillatable mercury switch, the actuation of which is synchronized with the ram movements by a mechanism deriving motion directly from the ram or the ram driving means. In this way timely and proper operation of the tool lifter is assured at all speeds and lengths of ram stroke. Power for operating the solenoid is taken from the main power lines, preferably from the motor side of the main switch, to insure that when the main motor is stopped and the machine is idle, the electrical circuit to the solenoid will also be broken even though the controlling switch is left in an effective position.

An important advantage possessed by the present invention is that if pressure is exerted by hand or otherwise, against the tool or clapper when in an elevated position, no damage to the device can occur. The magnetic field of the solenoid, under such a condition, resiliently absorbs the shock and functions as a protective feature.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:

Figure 1 is a side view partly in section of a shaping machine embodying this invention. Fig. 2 is a detailed front view of the shaper head illustrating a preferred location of the solenoid and the flexibility in adjustment. Fig. 3 is an enlarged side view of the forward portions of the shaper ram. Fig. 4 is a fragmentary front view, partly in section to illustrate the position of the lifting cam relative to the hinge axis. Figs. 5 and 6 are sectional views illustrating the positions of the clapper-box parts during a forward and return stroke respectively. Fig. 7 is a detail of a preferred form of control switch and its timing and actuating means. Fig. 8 is a plan view of portions of Fig. 7. Fig. 9 is a view of the switch panel with its cover removed. Figs. 10 and 11 are sectional views of the mercury switch element used in the mechanism disclosed in Figs. 7 and 9. Fig. 12 is a diagram of the control circuit. Fig. 13 illustrates an arrangement embodying a switch of a different type.

Referring more particularly to Fig. 1 of the drawings, the invention is disclosed embodied in a shaping machine having a base member 15, a main frame 16 provided with guideways 17 and 18 at the front and top surfaces thereof respectively.

A saddle member 19 is mounted for vertical adjustment on the front guides 17, and supports a laterally adjustable table or work support 20 at the front side thereof. The tool supporting member or ram 21 is reciprocably mounted on the upper guides 18 and carries at its forward end a revolvable tool head 22 which, in turn, supports a tool slide 23. The head 22 is journaled in bearings 24 provided by the ram and is adapted to be clamped in any angularly adjusted position by head-clamp means indicated generally as 25.

The clapper-box 26 is pivotally mounted on the cross-slide 23, on the pivot pin 27 and is clamped firmly thereto in adjusted position by the clamp screw 28, and when so clamped, angular movement of the head 22 likewise tilts the cross-slide. The clapper-box secured thereto is movable radially by means of the screw 29 and nut 30 to raise or lower the cutting point of the tool. The conventional clapper-box 26 consists of two parts, a bearing plate member 31 and a hinged clapper member 32 which is pivoted at 33 to the bearing plate between the forwardly projecting guide flanges 34 and 35.

A tool post 36 is supported by the clapper member below the pivot 33 and normally carries a tool 37 therein adjustable in the usual manner. During the cutting stroke, the clapper member seats firmly against the bearing plate 31 as it propels the tool forward through the workpiece. When the cut is finished, however, the tool and clapper member are free to swing forward and upwardly about the hinge axis so that on the return stroke of the ram, the tool may back-track over the workpiece.

The reciprocatory motion of the ram 21 is effected in this instance, by a slotted rocker-arm 38, one end of which is pivoted at 39 to the machine frame near its base, and the other end to the ram proper as at 40. The pivotal connection 40 is adjustable by the clamp 41 so that the position of the stroke of the ram may be changed to suit any particular operation. A crank-pin 42, adjustable radially of a large bull-gear 43, operates in the slot provided in the pitman and oscillates the latter as the gear is rotated. Changing the radial position of the crank-pin relative to the axis of the gear 43 serves to change the length of ram stroke. An electric motor 44 provides the power for operating the ram and for feeding the table laterally, and transmits its motion through two sets of change gears 45 and 46, of four speeds each, to the bull gear 43. The power feed to the work-support indicated generally at 47 is taken off the bull gear drive and gives an intermittent motion to the table cross feed shaft 48, a reversing mechanism 49 being provided whereby direction of the table movements may be reversed.

The controls for effecting the various motions of the shaper are well known and follow conventional design and have not therefore been illustrated. Further details may be had, however, by referring to the disclosure of U. S. Letters Patent No. 1,960,567.

In the normal operation of the machine the operator mounts a workpiece on the table 20, adjusts it to the approximate position by the elevating screw and nut devices 50 and makes the final adjustments for depth or shape of the cut by adjusting the tool slide angularly or vertically as required. The operator then positions the crank-pin 42 to give the desired stroke of the ram and adjusts its range of stroke and starts the machine.

The ram moves forward at the rate determined by the setting of the change gears and the tool removes a shaving from the surface of the workpiece. During the forward cutting stroke the clapper member seats firmly against its bearing plate, but at the end of the cut, the tool and clapper is free and on reversing of the ram, inertia swings the clapper a substantial distance away from the bearing plate and it falls with considerable noise and vibration.

In machines where the cross-feed of the work occurs during the reverse movement of the ram, the swinging tool fell upon the surface of the workpiece and wrought great damage both to the tool and work. Particularly, was that the case at the higher rates of reciprocations of the ram where the reversals occur more suddenly. In such instances the repeated impacts of the tool on the work increased in intensity and resulted in severe injury. The damage was still greater, moreover, with the use of cemented carbide tools for such tools are peculiarly sensitive to breakage when allowed to fall or back-track upon the workpiece.

The present invention aims to prevent damage and waste of that character and to materially increase the life of the cutting tool and improve the character of the finish produced on the surface of the workpiece. Figs. 1–12, illustrate a preferred construction eminently suitable to effect those objectives and consists of a solenoid operated cam 51 journaled in one of the flanges 34 of the clapper-box. For convenience in manufacture and to render the clapper capable of manual movement at any time, the cam 51 is one-way acting and formed upon a short shaft 52 interposed between the clapper member 32 and its bearing plate 31 at a point some distance removed from the hinge axis. Preferably the clapper member 32 is recessed, as at 53 to accommodate the cam, and is provided with an abutment pin or wear pin 54 positioned in the plane of rotation of the cam. Thus, when the cam shaft is oscillated, the cam engages the pin and forcibly moves the clapper about its hinged pivot, thereby positively elevating the tool.

A solenoid 55 is provided for actuating the cam shaft, and so that it will not interfere with the angular or vertical adjustments that may be made to the clapper-box or tool slide, it is mounted in an inconspicuous position directly upon the clapper-box 26, preferably at the side away from the operator's side of the machine.

The solenoid is of standard make and construction and is positioned so that the core or armature 56 normally reciprocates in an upright path so that gravity may assist the spring therein, in ejecting the armature when the winding is de-energized. In this instance the armature 56 is pivoted to a link member 57 which, in turn, is pivoted to a short lever 58 carried by the cam shaft 52. When the clapper element is in its closed position, against the bearing plate, the cam 51 is ineffective as illustrated in Figs. 3 and 5. In that position the lever 58 projects substantially at a right angle to the axis of the armature in order to obtain the maximum advantage when the solenoid is energized. A limit pin 59 is provided for limiting the movement of the armature whereby the degree of oscillation of the cam shaft may be set to suit the particular needs.

In this embodiment of the invention, the solenoid is de-energized on the forward movement of the ram, and the clapper 32 seats firmly against its bearing plate until the cutting stroke is completed. At the beginning of the return stroke of the ram, the solenoid is adapted to be energized whereby the tool is forcibly lifted and restrained from falling. To insure proper timing of the action of the tool lifter, the control therefore is actuated directly by the ram or the ram operating mechanism which always is in synchronism with the tool movements.

Figures 1, 7 and 8, of the drawings illustrate a preferred means for accomplishing that purpose which includes a rotatable mercury switch 60 supported in a tilting cradle 61 in a housing 62 that is secured preferably but not necessarily within the main frame of the machine to a front wall. The underside of the cradle has a pin and slot connection 63 with the upper end of a pivoted lever 64. The lower end of the lever 64 is pivoted at 65 to a part of the housing and is connected intermediate its ends with a short transversely arranged shaft member 66. The shaft 66 is provided with a pin and slot connection with the cradle actuating lever close to its fixed pivot, and a comparatively short endwise movement of the shaft 66 will rock the cradle through an appreciable arc and cause the switch to function.

A mercury switch, it will be seen possess a number of additional advantages not found in pole type of switches. In the first instance the switch terminals are fully enclosed in glass and there are no open arcs exposed to oil vapors of the machine. The switch is therefore fire-proof and explosion-proof. Also, it is an inherent characteristic of mercury switches of this type to make either perfect contact or none at all depending upon its position in space, and thus deterioration of contact points and generally unreliable action is eliminated. In installations where it is desired not to use a relay between the switch and solenoid, it is preferable to use a mercury switch such as above mentioned for this purpose.

A further concept of this invention resides in the manner of actuating the switch to a position wherein contact is made at the start of the return stroke of the tool and broken at the start of the forward movement. In the present embodiment of the invention, the switch is actuated directly by the ram rocker arm 38 by means of a sliding semi-positive connection shown more clearly in Figs. 7 and 8. The sliding connection comprises a rod 67 pivoted to the shaft 66 and which passes through an opening in a rotatable stud 68 journaled to one side of the rocker arm 38. A friction applying means preferably in the form of a leaf spring 69 is mounted on the stud and exerts a pressure on the rod 67. Normally, the friction device tends to propel the rod forwardly or backwardly as the rocker-arm oscillates about its pivot 39. Stops 70 and 70ª projecting from the cradle actuating shaft 66 limit the axial movement of the shaft to that required to oscillate the mercury switch from its fully "open" position to its "closed" position, an angular distance of approximately 30 degrees in the present embodiment. After the rod has been moved its proper distance the friction shoe device yields and slides along the rod with the movement of the rocker-arm. Upon reversal of the oscillating movement of the rocker-arm the friction shoe immediately again takes hold of the shaft 66 and propels it in the opposite direction until stopped by one of the stops 70 or 70ª. That movement tilts the switch to its opposite position and thereafter the friction shoe slides as before.

With the present construction, it will be observed that axial movement of the switch actuating rod 66 occurs only at the initial part of the reverse movement of the rocker-arm, and is such a slight axial movement and the switch so sensitive that the contacts to the solenoid are made or broken and the tool elevated or lowered almost instantaneously with the reversal in tool movement. It will be observed also that the length of ram stroke or its speed does not alter or affect the operation of the mechanism for it is self adjusting to any length of stroke and automatically operative at any speed within the range of the machine.

The same applies to the operation of the switch 90 in Fig. 13. In this embodiment, a microswitch is employed in which the plunger 91 has a movement of only a few thousandths to close the normally open contacts 92 and is adapted to be actuated directly by the friction shaft 67. Thus, the solenoid 55 may be caused to be energized practically instantaneously with the commencement of the return stroke, and conversely.

The electrical circuit for the solenoid is diagrammatically illustrated in Fig. 12. The lines L¹, L² and L³ represent the main power lines leading into the machine and connected with the terminals of a main switch 74 which controls the operation of the motor 44. At the motor side of the master switch 74, two branch lines 75 and 76 are taken off and lead to the switch panel 62. One of the lines connects directly with the solenoid 55 and the other passes through the switch whereby the circuit to the solenoid is made or broken as herein explained. Flexible connectors 77 and 78 are provided at the switch to permit oscillatory movements thereof.

The wiring within the machine is preferably encased in oilproof flexible conduits, strapped at intervals to the machine parts, the conduit 79, however, being strapped to the rocker-arm starting at a point near its fixed pivot and then to the ram proper. The conduit 79 emerges from the ram at a point near the revolvable head 22 and then connects with the terminals of the solenoid. Sufficient slack is provided at all movable joints to allow freedom of movement or adjustment of the parts to their maximum positions. An auxiliary switch 81 is inserted in the conduit 80, operable from the outside of the machine, for the purpose of rendering the electrical tool lifter ineffective when desired.

By arranging the mechanisms and electrical connections in this manner, the head 22 is kept free of bulky mechanisms that would interfere with its adjustments or with the operation of the machine and the head thereby is capable of free-movement to any operating position. And by connecting the tool lifting circuit to the motor side of the master switch the user is assured that the current to the solenoid does not continue "on" in the event that the power drive is stopped with the solenoid control switch in an effective position. When the operator desires to lift the tool manually for certain types of shaping operations or to inspect the cutting point of the tool, the present device is arranged so that tool and clapper may be readily lifted independently of and without effecting the operation of the automatic lifting mechanisms.

The operation of the electrical tool lifter and its control is as follows: When the ram is moving forward on its cutting stroke, the rocker-arm 38 is moving clockwise about its fixed pivot. The friction shoe 68—69 carried thereby has, at the start of the movement, moved the control shaft 66 to the right until stopped by the stop-pin 70, and the solenoid is de-energized. Further movement of the rocker-arm in the forward direction causes the friction shoe to slide on the control shaft. Inertia of the tool and clapper elements, and the work resistance encountered, causes the clapper to seat firmly on its bearing plate between the flanges 34 and 35, and the cutting operation is performed.

At the end of the cut, the tool and clapper are free to swing forward and upwardly, and upon the sudden reversal of the ram, that action of the clapper normally occurs. To insure that the tool will be lifted clear of the work surface and be positively prevented from falling or back-tracking thereon during the return stroke, the solenoid 55 is energized and cam shaft 52 oscillated, during the initial portion of the return stroke, to an effective position. As will be apparent from Fig. 7, the levers and pivotal connections to the mercury switch are so related that a slight movement of the ram in the reverse direction, moves the control shaft 66 to the left and the mercury switch is oscillated to a position wherein the mercury flows through the opening 60ᵃ in the switch and the circuit to the solenoid is completed. Immediately the armature thereof is lifted, the cam shaft 52 oscillated and the clapper member positively moved to a position wherein the tool is elevated.

Throughout the return movement the solenoid is energized and the parts remain in this position, thus positively preventing the tool from falling or being dragged along the work-piece. As soon as the ram starts forward again, the switch is actuated to its other position, the mercury parts at the opening 60ᵃ and the solenoid circuit is broken. The plunger of the solenoid immediately ejects itself, and the cam shaft 52 oscillated in the reverse direction and the clapper and tool drop by gravity to their normal working positions before the cut actually starts.

By this arrangement, it will be seen, the tool is forcibly lifted and does not strike the work during the return stroke and the cutting edge thereof and surface of the workpiece are preserved and unmarred. Repeated clapping heretofore occasioned by back-tracking of the tool and the noise incident thereto has also been eliminated.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:—

Having thus revealed this invention, we claim as new and desire to secure the following combinations and elements, or equivalents thereof, by Letters Patent of the United States:

1. A shaping machine combining a supporting frame structure, a ram reciprocably mounted thereon, a clapper-box device carried by said ram adapted to support a tool in operative relation with a workpiece, power means for reciprocating said ram including an oscillatable rocker-arm element pivoted at one end to said frame and at the other end to said ram; a friction shoe device carried by said rocker-arm intermediate said pivots; a switch mechanism supported by said frame adapted to be actuated by said friction device at the start of each reverse oscillation of said rocker-arm; a semi-positive connection between said friction shoe device and said switch; said clapper-box including a pivoted clapper member and an electrical solenoid operatively connected therewith adapted when energized to move the said clapper member about its pivot; electrical connections between said solenoid and said switch device and between said switch and a source of current supply; and a second switch means in said connections electively operable to render said solenoid inoperative to move said clapper member.

2. A shaping machine combining a supporting frame structure, a ram reciprocably mounted thereon, a clapper-box device carried by said ram adapted to support a tool in operative relation with a workpiece, power means for reciprocating said ram including an electric motor, an oscillatable rocker-arm element pivoted at one end to said frame and at the other end to said ram propelled thereby, a source of current for the motor and a master switch between said source and motor; a friction shoe device carried by said rocker-arm intermediate said pivots, a second control switch mechanism supported by said frame adapted to be actuated by said friction device at the start of each reverse oscillation of said rocker-arm; a semi-positive connection between said friction shoe device and said second switch; said clapper-box including a pivoted clapper member and an electrical solenoid operatively connected therewith adapted when energized to move the said clapper member about its pivot; electrical connections between said solenoid and said second switch and between said second switch and the motor side of said master switch; and a third switch means in said connections electively operable to render said solenoid inoperative to move said clapper member irrespective of the action of said friction device.

3. In a shaping machine the combination of a supporting frame structure, a ram reciprocably mounted thereon, a clapper-box device adjustable thereon and adapted to support a tool in operative relation with a workpiece, power means for reciprocating said ram including an oscillatable rocker-arm element pivoted to said frame and to said ram; a friction shoe device carried by said rocker-arm; a switch mechanism supported by said frame; a connection between said friction device and said switch mechanism adapted to actuate the latter at the start of each reverse oscillation of said rocker-arm; said clapper-box including a pivoted clapper member and a solenoid for actuating same to a position effective to elevate the tool away from the workpiece; and flexible connections between said solenoid and said switch device operative around curves or bends as determined by the adjustment of said clapper-box on said ram and at all lengths of ram stroke for transmitting the current impulses of said switch to said solenoid.

4. A shaping machine combining a main frame; a ram member reciprocable in guideways formed along the top thereof; a clapper-box carried by said ram and adapted to support a tool in operative relation with a workpiece, said clapper-box including a bearing plate member and a hinged tool supporting clapper member normally seating thereon; power means for reciprocating said ram including a rocker-arm element pivoted at one end to said frame and at its other end to said ram; solenoid operated means adapted when energized to move said clapper member away from its seat about its hinge; a switch mechanism supported by said frame for controlling the action of said solenoid actuated means; and an adjustable connection between said rocker-arm and said switch mechanism operative to close the switch and complete the circuit to the solenoid at the start of the return movement of the rocker-arm and to open the circuit to the solenoid at the start of the forward movement of the rocker-arm and automatically to adjust itself to the varying distance between the extremes of rocker-arm movement, said adjustable connection comprising a lever connected with said switch and a semipositive friction device connecting said lever with said rocker-arm.

5. A tool lifting device for a shaping machine combining a main frame; a ram member slidable in guideways formed thereon; power means for reciprocating said ram including an oscillatable rocker-arm pivoted at one end to said frame and at the other end to said ram; a clapper-box mechanism carried by said ram comprising a bearing plate element and a hinged tool supporting clapper element normally seating thereon; means for varying the length of stroke of reciprocation of said ram; and means automatically operable at all lengths of ram stroke for actuating and maintaining said tool-supporting clapper element away from its seat on the bearing plate element during each return reciprocation of the ram comprising a solenoid mechanism mounted on said clapper-box and operatively connected with said hinged clapper element, a control switch therefor, a slide rod for actuating said switch and a semipositive connection between said slide rod and said rocker-arm, said connection operating to actuate said switch at the start of each reverse oscillation of said rocker-arm and thereafter yielding to maintain said switch in said position until a succeeding reversal occurs irrespective of the length of ram stroke.

6. A shaping machine combining a supporting frame structure; a ram member reciprocably mounted thereon; stroke varying means for said ram; an angularly adjustable clapper-box device carried thereby adapted to support a tool in operative relation with a workpiece, said clapper-box including a hinged tool supporting clapper member; power means for reciprocating said ram including an oscillatable rocker-arm element; a friction shoe device carried by said rocker-arm; a switch mechanism actuated by said friction device at the start of each reverse oscillation of said rocker-arm; said clapper-box including a solenoid means operatively connected with said hinged clapper member adapted when energized to actuate said clapper element to a position effective to move the tool away from the workpiece; and connections between said solenoid and said switch mechanism operative in all positions of angular adjustment of said clapper-box and at all lengths of ram stroke for transmitting to said solenoid means the impulses of said switch.

7. A tool lifter for shaping machines having a frame, a reciprocable ram mounted thereon and power means for reciprocating the ram, combining a clapper-box mounted at one end of said ram adapted to support a cutting tool in operative relation with a workpiece including a bearing plate member and a clapper member pivoted thereto and normally seating on said bearing plate; a cam element operating between said last named members at a distance removed from said pivot and adapted when actuated to an effective position to urge said clapper member about the pivot and away from its seat on the bearing plate; solenoid operated means mounted on said clapper-box device for actuating said cam; a control switch for said solenoid means; said power means including an oscillatable lever pivoted to said ram and to said frame; and a semipositive sliding connection between the said lever and said switch operative at the start of the return movement of the lever for actuating said switch thereby to render said solenoid means effective to move said clapper at the start of the return stroke and thereafter yielding to maintain said clapper member away from its seat during the return movement of said ram.

8. A tool lifter for shaping machines having a frame, a reciprocable ram mounted thereon and power means for reciprocating the ram, combining a clapper-box device mounted at one end of said ram adapted to support a cutting tool in operative relation with a workpiece, comprising a bearing plate member and a clapper member pivoted thereto and normally seating on said bearing plate; a cam element operating between said last named members and adapted when actuated to an effective position to urge said clapper member away from its seat on the bearing plate; electrically operated means mounted on said clapper-box device for actuating said cam; a control switch for said electrical means; said power means including an oscillatable lever pivoted to said ram and to said frame; and means including a link member connected with said switch and an impositive sliding connection between said link and said oscillatable lever for actuating said switch, said means operating to actuate said switch to its closed position at the start of the return movement of the clapper box whereby the cutting tool is elevated and thereafter yielding to maintain said switch in said closed position throughout said return movement.

9. A tool lifter for shaping machines having a frame, a reciprocable ram mounted thereon and power means for reciprocating the ram combining a clapper-box device mounted at one end of said ram adapted to support a cutting tool in operative relation with a workpiece, said clapper-box device comprising a bearing plate member and a clapper member pivoted thereto and normally seating on said bearing plate; a cam element operating between said last named members and adapted when actuated to an effective position to urge said members apart; power means mounted on said clapper-box device for actuating said cam; control means for said power means for cyclically controlling the action thereof, including a link member and an impositive connection between said link member and said ram reciprocating means, said impositive connection operating to render the power means for the clapper-box operative to move said clapper member away from its seat at the start of the return movement of the ram and thereafter yieldingly maintaining the said power means for the clapper-box operative throughout the said return movement.

10. A shaping machine combining a main-frame; a ram member reciprocable in guideways formed along the top thereof; an angularly adjustable clapper-box reciprocated by said ram and adapted to support a tool in operative relation with a workpiece, said clapper-box including a bearing plate member and a tool supporting clapper member hinged thereto and normally seating thereon; power means for reciprocating said ram; power means mounted on said angularly adjustable clapper-box adapted when actuated to move said clapper member away from its seat on said bearing plate; control means for said second mentioned power means; and an impositive mechanical connection between said control means and said clapper-box reciprocating means automatically operative in timed relation with the return reciprocatory movements of said ram for actuating said control means to effect movement of said clapper member away from its seat on the said bearing plate during the return movements of said ram and to allow said clapper member to resume its normal position on said bearing plate during the forward movements of said ram.

11. A shaping machine combining a main frame; a ram member reciprocable in guideways formed along the top thereof; a clapper-box reciprocated by said ram and adapted to support a tool in operative relation with a work piece, said clapper-box including a bearing plate member and a hinged tool supporting clapper member normally seating thereon; means for reciprocating said ram; solenoid operated means carried by said clapper-box adapted when effective to move said clapper member away from its seat on said bearing plate; control means for said solenoid operated means including a translatable link member and an impositive sliding connection between said link and said clapper-box reciprocating means automatically operative in timed relation with the return reciprocatory movements of said clapper-box for actuating said control means thereby to effect movement of said clapper member away from its seat on the said bearing plate during said return movements.

WILLIAM F. ZIMMERMANN.
GRANGER DAVENPORT.